United States Patent [19]

Uda et al.

[11] Patent Number: 4,942,739
[45] Date of Patent: Jul. 24, 1990

[54] MIXING CHAMBER FOR AN AIR-CONDITIONING SYSTEM

[75] Inventors: Akira Uda, Kakamigahara; Yoshio Yoshida, Ogaki; Makoto Harada, Minokamo; Masaaki Sato, Kakamigahara, all of Japan

[73] Assignees: Kawasaki Jukogyo Kabushiki Kaisha; Japan Aircraft Development Corporation, both of Japan

[21] Appl. No.: 378,379

[22] Filed: Jul. 11, 1989

[30] Foreign Application Priority Data

Jul. 11, 1988 [JP] Japan .................. 63-172448

[51] Int. Cl.$^5$ ............................. F25D 17/06
[52] U.S. Cl. ........................ 62/93; 62/283; 55/448
[58] Field of Search ............. 62/93, 272, 283; 55/448

[56] References Cited

U.S. PATENT DOCUMENTS

| | | | |
|---|---|---|---|
| 2,519,028 | 8/1950 | Dodge | 62/93 |
| 2,651,269 | 9/1953 | French | 104/32.1 |
| 3,854,300 | 12/1974 | Gerhold | 62/93 |
| 4,517,813 | 5/1985 | Eggebrecht et al. | 62/93 |

Primary Examiner—Ronald C. Capossela
Attorney, Agent, or Firm—Stevens, Davis, Miller & Mosher

[57] ABSTRACT

A mixing chamber for an air-conditioning system including a cylindrical vessel having a plurality of inlet ports provided at an axial end portion for introducing cool air from an air-conditioning unit and warm air from passenger compartments. The vessel is further provided at the other axial end portion with outlet ports. The inlet and outlet ports are oriented in a tangential direction with respect to the vessel to thereby form a spiral air flow in the vessel. The vessel has a water capturing ring located along the inner wall surface of the vessel to prevent film of water on the inner wall surface of the vessel from flowing toward the outlet ports. A water drawing slit is formed in the vessel to open to the inner wall surface at a side of the water capturing ring adjacent to the inlet ports to discharge the water accumulated at this side of the ring.

6 Claims, 4 Drawing Sheets

MIXING CHAMBER FOR AN AIR-CONDITIONING SYSTEM

BACKGROUND OF THE INVENTION

1. Field of the Invention

The present invention relates to an air-conditioning system. More particularly, the present invention relates to a mixing chamber used in an air-conditioning system for mixing cool air with warm air.

2. Description of the Prior Art

The U.S. Pat. No. 4,517,813 discloses a mixing device suitable for use in an air-conditioning apparatus for a large carrier aircraft. The mixing device is specifically designed to mix cool air from an air-conditioning unit with warm air which has been drawn from passenger compartments to thereby produce conditioned air. As shown in FIGS. 4 and 5, the mixing device shown in the U.S. patent includes a cylindrical mixing chamber 1 which is provided at a lower end portion with a plurality of air inlet ports 2. Cool air is transported from an air-conditioning unit through meets at a duct 6 with warm circulating air which has been drawn from the passenger compartments and transmitted through a filter 4 provided in a duct 5. The mixture of the cool air and the warm air is then introduced tangentially into the mixing chamber 1.

The air introduced into the mixing chamber 1 is then form an upwardly directed swirling flow and the cool air is mixed with the warm air during the course of upward flow in the mixing chamber 1. The mixed air is then discharged through discharge ports 7 to be distributed to desired portions in the aircraft. The cool air is passed through a water separator before it is introduced into the duct 3. However, it is impossible to remove moisture completely so that the mixing device is provided with a further water separator for preventing water from being carried to the passenger compartments. For the purpose, there is an angle member which is attached to the inner wall surface of the mixing chamber to form a spirally extending water discharge passage 8 which is arranged to cross the spiral upward air flow in the mixing chamber 1. The water content in the air is deposited under the influence of the centrifugal force on the inner wall surface of the mixing chamber 1 and directed to the discharge port 9 which is formed in the lower part of the mixing chamber 1. A water capturing ring 24 is provided right above the water discharge passage 8 for capturing water which has not been collected by the passage 8. The water captured by the ring 24 is directed to the passage 8 to be discharged through the discharge port 9.

It has been found that the mixing device as shown by the U.S. patent has a problem that a substantial part of the water which has been deposited on the inner wall surface of the cylindrical mixing chamber 1 and introduced into the discharge passage 8 to be discharged is apt to be caught again by the upward air stream to be accompanied thereby to the passenger compartments. This phenomenon is particularly significant when the air introduced into the mixing chamber has a high moisture content and/or the spiral upward air flow is of a high flow speed. The U.S. patent shows a structure wherein the mixing chamber 1 is provided at the exit end portion with a flow straightening grid, however, the grid is not sufficient to capture the water content to a satisfactory extent.

SUMMARY OF THE INVENTION

It is therefore an object of the present invention to provide a mixing chamber for an air-conditioning system which has a high capability of capturing water content in the air.

Another object of the present invention is to provide a structure for a mixing chamber wherein the water deposited on the wall of the chamber can be effectively drawn out of the chamber.

According to the present invention, the above and other objects can be accomplished by a mixing chamber for an air-conditioning system which includes a cylindrical vessel having an inner wall surface, a water capturing ring provided on said inner wall surface to extend circumferentially throughout periphery of said inner wall surface, opening means formed in said vessel to open to said inner wall surface for drawing water deposited on said inner wall surface.

As in a conventional mixing chamber, the mixing chamber in accordance with the present invention is provided at one axial end portion of the vessel with tangentially extending inlet means and at the other end portion with tangentially extending outlet means for producing a spiral air flow from the inlet means to the outlet means. The air introduced into the mixing chamber forms steady spiral flow at a certain axial distance from the inlet means. It is preferable that the water capturing ring is located at a position apart from the inlet means so that it is in the steady spiral air flow. If the location of the water capturing ring is not sufficiently apart from the inlet means, the ring will be still in the area wherein turbulent air flow prevails so that the water separated from the air may jump over the ring toward the outlet means. Therefore, the water separation will no be made efficiently.

According to the structure of the mixing chamber of the present invention, the air is introduced into the vessel with a slight moisture content. The part of the air having a higher moisture content is concentrated under the centrifugal force in the vicinity of the inner wall surface of the vessel and the moisture is separated from the air to form water droplets which are deposited on the inner wall surface of the vessel to form a film of water. The film of water is under an influence of the air flow in the vessel so that it tends to flow in the direction of the air flow. However, the film of water is prevented to flow beyond the water capturing ring so that water is collected beneath the ring and moves horizontally along the ring. The water is then discharged through the opening means which may be in the form of slits formed in the wall of the vessel. A part of water deposited on the inner wall surface of the vessel may flow downwardly along the inner wall surface of the vessel. It is therefore preferable to provide the vessel with a discharge port at the bottom end portion.

The above and other objects and features of the present invention will become apparent from the following description of a preferred embodiment taking reference to the accompanying drawings.

DESCRIPTION OF THE PREFERRED EMBODIMENT

Figure 1:
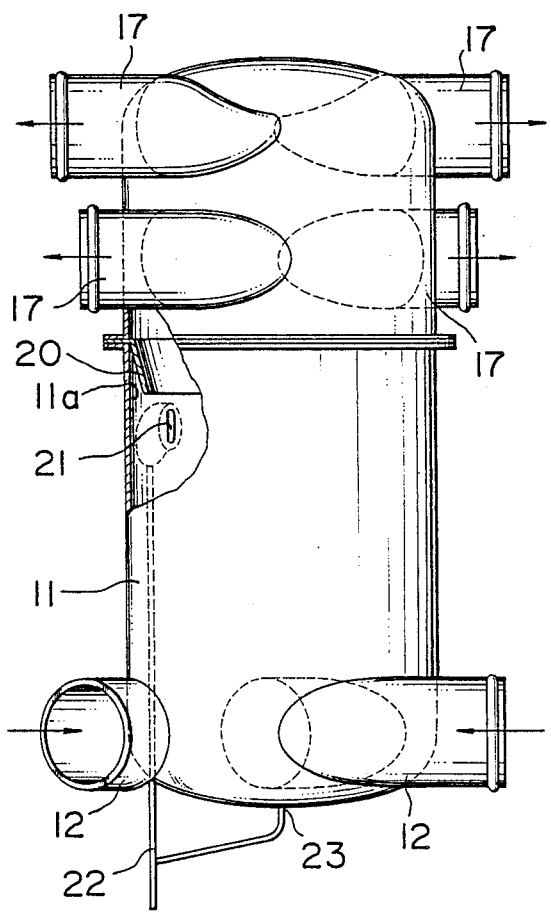
FIG. 1 is a partially broken side view of a mixing chamber in accordance with one embodiment of the present invention.
Figure 2:
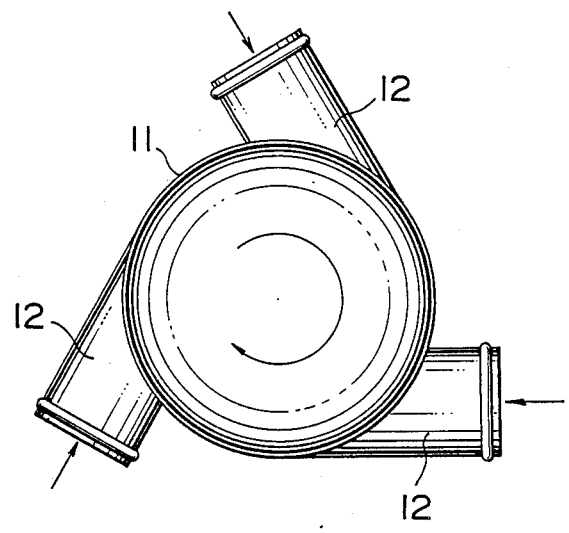
FIG. 2 is a plan view showing the arrangement of the inlet ports.
Figure 3:
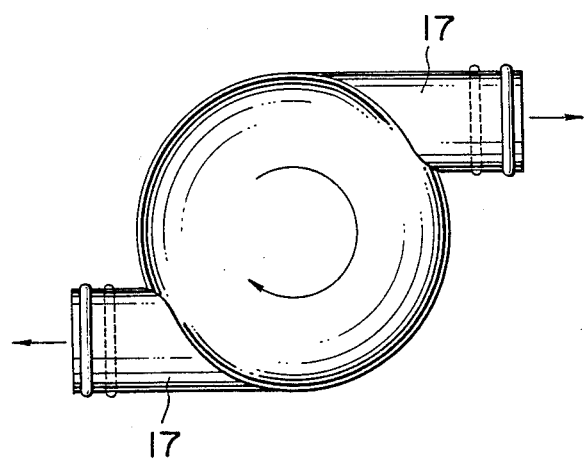
FIG. 3 is a plan view showing the arrangement of the outlet ports.
Figure 4:
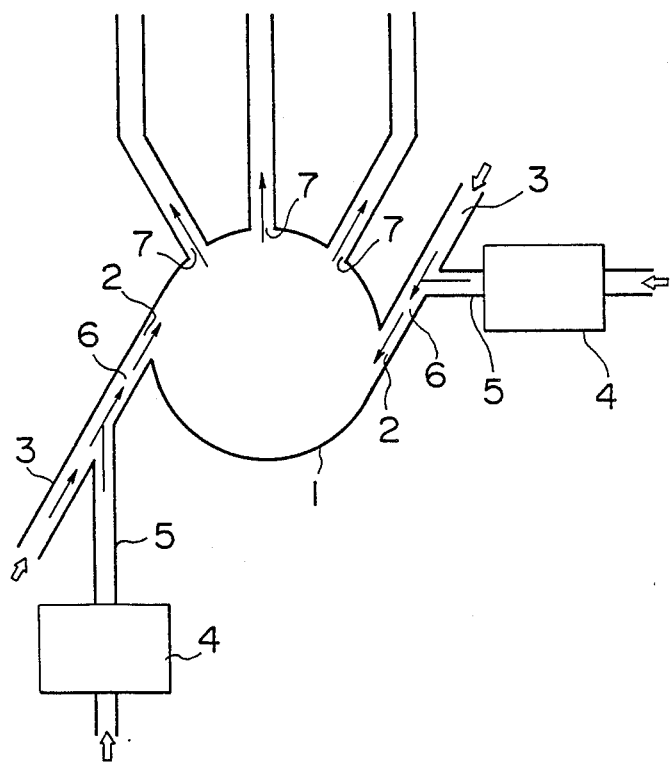
FIG. 4 is a diagrammatical plan view of a mixing chamber for a conventional air-conditioning system; and, FIG. 5 is a partially broken side view showing the detail of the conventional mixing chamber.
Figure 5:
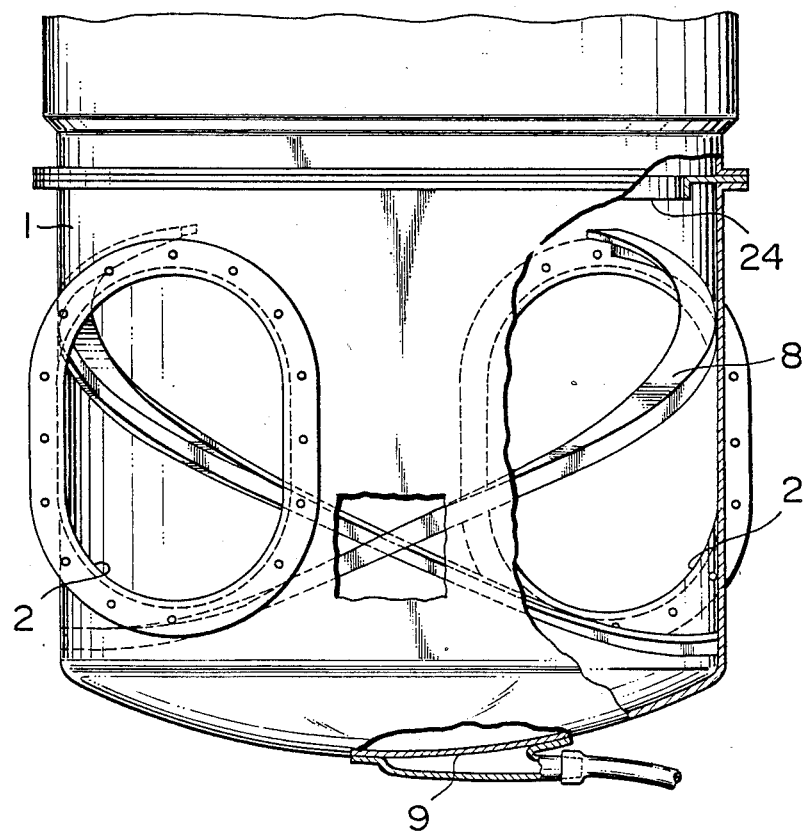

Referring to the drawings, particularly to FIGS. 1 through 3, there is shown a mixing chamber in accordance with one embodiment of the present invention. The mixing chamber includes a vessel 11 of a cylindrical configuration which is provided at the lower portion with three inlet ports 12 as shown in FIG. 2. The inlet ports 12 are arranged substantially tangentially with respect to the cylindrical vessel 11. The inlet ports 12 correspond to the air inlets 2 of the conventional design shown in FIGS. 4 and 5 so that cool air from an air-conditioning unit and circulating air from passenger compartments are introduced into the vessel 11 through the inlet ports 12. The vessel 11 is further formed at the upper end portion with a desired number of air outlet ports 17. As shown in FIG. 3, the outlet ports 17 are also arranged substantially tangentially with respect to the cylindrical vessel 11.

Referring to FIG. 1, the vessel 11 is provided on the inner wall surface 11a with a water capturing ring 20 which is located between the inlet ports 12 and the outlet ports 17. The water capturing ring 20 is in the form of an oblique flange which is inclined downwardly toward radially inwardly. Beneath the ring 20, the vessel is formed with a water drawing slit 21 which extends in a vertical direction. A water discharge pipe 22 is connected to the vessel 11 and communicates with the slit 21. The vessel 11 is further formed at the bottom portion with a water discharge port 23 which is also connected with the pipe 22.

In operation, the air which has been introduced into the vessel 11 through the inlet ports 12 forms a spiral upward flow in the vessel 11. The moisture content in the air is concentrated to the radially outward portion in the vessel 11 and separated from the air to form a film of water on the inner wall surface 11a of the vessel 11. The film of water thus formed is under the influence of the spiral upward air flow in the vessel 11 so that it tends to move in the direction of the air flow. However, the water capturing ring 20 prevents the film of water beyond the ring 20 so that water accumulates beneath the ring 20 and moves along the ring 20 in the horizontal direction. The water is then expelled through the slit 21 to the pipe 22. A portion of the water in the film flows downward along the inner wall surface 11a of the vessel 11 to the bottom and discharged through the port 23. It has been recognized that the water separating function is effective irrespective of the temperature of the air introduced into the vessel 11.

It will be noted that in the structure described above there is no part which may disturb the air flow in the vessel. There is not provided even a flow straightening grid as in the conventional design. The outlet ports 17 are arranged in the tangential direction with respect to the vessel 11 so that the resistance to the air flow can be significantly decreased. It has been proved that with this simple structure, mixing of air can be effectively accomplished.

The invention has thus been shown and described with reference to a specific embodiment, however, it should be noted that the invention is in no way limited to the details of the illustrated structures but changes and modifications may be made without departing from the scope of the appended claims.

We claim:

1. A mixing chamber for an air-conditioning system comprising a vessel of a cylindrical configuration, inlet port means formed in said vessel at one axial end portion and oriented in a tangential direction with respect to said vessel to introduce air and form a spiral air flow in said vessel, outlet port means formed in said vessel at the other axial end portion to discharge the air, water capturing means provided on an inner wall surface of said vessel to extend circumferentially along said inner wall surface for preventing water on said inner wall surface from flowing beyond said water capturing means toward said other axial end portion of said vessel, opening means formed in said vessel to open to said inner wall surface at a side adjacent to said inlet port means to draw water accumulated on said inner wall surface of said vessel at said side of said water capturing means.

2. A mixing chamber in accordance with claim 1 in which said water capturing means includes a ring member extending along said inner wall surface of said vessel.

3. A mixing chamber in accordance with claim 2 in which said ring member includes an oblique flange which is inclined toward said inlet port means.

4. A mixing chamber in accordance with claim 1 in which said outlet port means is arranged in a tangential direction with respect to said vessel.

5. A mixing chamber in accordance with claim 1 in which said vessel is arranged vertically with said outlet port means disposed at an upward position, said vessel being formed at the end adjacent to said inlet port means with discharge port means for discharging water which has flown along said inner wall surface of said vessel to said end adjacent to said inlet port means.

6. A mixing chamber in accordance with claim 6 in which said opening means includes a slit which extends in a substantially vertical direction.

* * * * *